United States Patent [19]

Piggott

[11] 4,427,735
[45] Jan. 24, 1984

[54] CONTROLLED MATRIX CONTRACTION COMPOSITES

[76] Inventor: Michael R. Piggott, 35 Addington Ave., Toronto, Ontario, Canada

[21] Appl. No.: 267,612

[22] Filed: May 27, 1981

[30] Foreign Application Priority Data

Jun. 6, 1980 [GB] United Kingdom ................. 8018621

[51] Int. Cl.³ .............................................. B32B 5/16
[52] U.S. Cl. ................................... 428/283; 428/288; 428/297; 428/402; 428/406; 428/408; 428/417; 428/430; 428/902; 523/468
[58] Field of Search ............... 428/283, 288, 297, 303, 428/325, 402, 406, 408, 417, 430, 902; 523/468

[56] References Cited

U.S. PATENT DOCUMENTS 3,806,489  4/1974  Rieux et al. .......................... 523/468
4,364,990  12/1982  Haines ................................. 428/408

Primary Examiner—James J. Bell
Attorney, Agent, or Firm—Sim & McBurney

[57] ABSTRACT

There is provided a method of increasing the toughness of a fibre-reinforced composite material. The fibre and matrix material are so selected that, upon development in the matrix of a crack bridged by a fibre, the grip of the matrix on the fibre due to matrix shrinkage will be small enough to allow the fibre, while stretching, to progressively shrink away from the matrix beginning at the crack, but large enough to cause the fibre to break when the progressive fibre shrinkage reaches a major flaw in the fibre. This is effectively accomplished by making the fibre Poisson's shrinkage at breaking stress substantially the same as the matrix contraction strain. The latter can be adjusted by mixing with the basic matrix material a selected quantity of an additional substance, such as spiro polymer or an inert particulate material.

12 Claims, 3 Drawing Figures

CONTROLLED MATRIX CONTRACTION COMPOSITES

This invention relates generally to composites which typically include a plastic matrix and a plurality of reinforcing fibres embedded in the matrix. More particularly, this invention relates to the selection and/or adjustment of certain characteristics of the matrix and/or the fibres, so that certain desirable properties in the resultant composite, notably the toughness of the composite, can be enhanced.

BACKGROUND OF THIS INVENTION

It is well known that adding glass fibres to a plastic makes the plastic much stronger and less easily deformed. This composite material can be used to replace metals, but it has two problems. One is that it is rather less stiff, and the other is that it is more brittle, which means that it cracks too easily when hit, and when cracked can be too easily broken. The stiffness (or Young's modulus) can be improved if the glass fibres are replaced by carbon or boron fibres. Unfortunately, these composites are much more brittle than glass fibre composites.

It is also known that composites can be made more tough (i.e. less brittle) by (1) using tough fibres, or (2) by making the plastic matrix tougher, or (3) by sticking the matrix to the fibres less well, or (4) by using very large diameter fibres. Unfortunately, (1) tough fibres such as Kevlar (T.M.) do not impart such a high Young's modulus to the composite as do carbon or boron fibres; (2) making the matrix tougher has only a small effect on composite toughness; (3) reducing the adhesion between matrix and fibres reduces some important strengths of the composite (e.g. the shear strength); and (4) making large diameter fibres which are strong is extremely difficult and expensive. Thus, known procedures cannot be used to make economic composites which combine great toughness, high strength, and great stiffness. This subject has recently been critically reviewed in Proc. ICF4 1 557 (1977), G. A. Cooper and M. R. Piggott.

GENERAL DESCRIPTION OF THIS INVENTION

The aim of an aspect of this invention is to make fibre composites which are very tough, while also being very stiff and very strong. Put another way, this invention aims to provide composites in which toughness is enhanced without sacrificing stiffness or strength.

This aim may be achieved by designing the composite so that when the plastic matrix cracks (when, for example, the composite is struck) the fibres which bridge the crack will only break inside the matrix a long way from the crack surfaces.

To make the fibres break a relatively long way from the crack inside the matrix itself, the fibres must break preferentially at large flaws rather than at small ones, since large flaws are infrequent and far apart. To do this one much make it possible for the fibre to shrink away from the matrix when the opening crack only exerts a moderate pull on the fibre, because with a moderate fibre tension, the small flaws, which are close together, will not be activated.

When the fibre has broken, it loses its tension and thus recovers its original diameter. The fibre is then pulled out of the matrix as the crack opens, and this pulling out absorbs energy due to friction between the fibre and its hole in the matrix. The longer the pulled-out length, the greater the work expended. This work is the main part of the work of fracture, and the larger the work, the greater is the toughness of the composite.

Accordingly, this invention provides a fibre-reinforced composite material comprising a matrix material and a plurality of fibres embedded in the matrix. The matrix material is one which, in a liquid or plasticized state, is used to impregnate the fibres either as a solution, a liquid or as a highly viscous hot liquid. During the curing or solidification step the matrix shrinks while the fibres hardly shrink at all. The Young's modulus of the matrix is $E$, and its linear shrinkage while curing, solidifying and cooling is $S$. The plurality of fibres have an average Poisson's shrinkage at breaking stress of $C$, this being defined as the fibre breaking strain measured on a moderate fibre length, multiplied by the fibre Poisson's ratio. By making $S$ substantially equal to, but not smaller than, the product of $C$ and $E$, the fibres will tend preferentially to break only at the large flaws, and this will enhance toughness.

$S$ may be measured by methods well known in the art, such as using the change in length of a sample during cure or solidification, and using the modulus, $E$. $C$ should be determined from the strength, measured on a length of fibre between 1 mm and 1 cm, and the modulus and Poisson's ratio of the fibre. Methods for measuring $E$ are also well known.

Expressing the matter in a slightly different way, the essence of the invention is that, having selected a batch of fibres, the matrix material is specially made using a mixture of ingredients, so that, upon development in the matrix of a crack bridged by a fibre, the grip of the matrix on the fibre due to the matrix shrinkage will be small enough to allow the fibre, while stretching, to progressively shrink away from the matrix beginning at the crack, but large enough to cause the fibre to break when the progressive fibre shrinkage reaches a major flaw in the fibre.

This latter process can be observed in the microscope when the composite is made very thin, so that one fibre can be watched.

The expression $S/E$ may be defined as the matrix contraction strain, and another way of defining the invention is to say that the fibre and matrix are so selected that the fibre Poisson's shrinkage at the breaking stress is substantially the same as the matrix contraction strain.

In one preferred embodiment of this invention, the match of fibre Poisson's shrinkage to matrix contraction strain can be accomplished by the use of particulate fillers in the matrix which inhibit matrix contraction and/or increase the matrix modulus.

Typical matrix materials include thermosets such as epoxy, polyester, melamine formaldehyde, phenol formaldehyde, urea formaldehyde, silicone cast room temperature vulcanizing resins, and thermoplastics such as ABS, acetal resin, polymethyl methacrylate, cellulose acetate, chlorinated polyether, polytetrafluoroethylene, ionomer, nylon, polyphenylene oxide, polycarbonate, polyethylene, polybutene, polyimide, polymethylpentene, polysulphone, polystyrene, and vinyl.

GENERAL DESCRIPTION OF THE DRAWINGS

In the accompanying figures:

FIG. 1 shows a series of sections through a crack in a fibre-reinforced matrix; and FIGS. 2 and 3 are graphs of theoretical curves useful for explaining the theoretical basis of this invention.

DETAILED DESCRIPTION OF THE DRAWINGS

Figure 1:
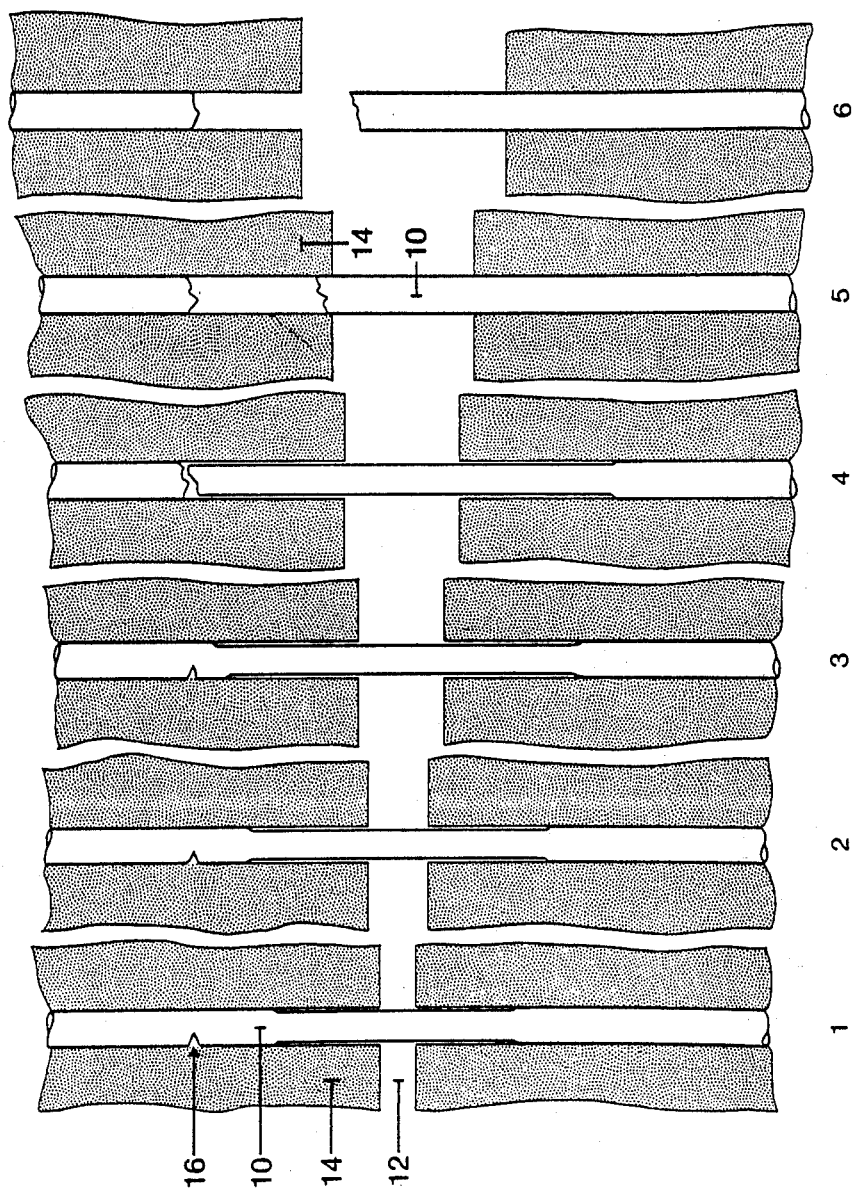

In FIG. 1, the various sections show sequential stages in the opening or separation of a crack in a matrix. Section 1 of FIG. 1 shows a fibre 10 bridging a crack 12 in a matrix 14. Fibres always contain flaws or microcracks on their surfaces, and one relatively large flaw is shown in section 1 of FIG. 1 at the numeral 16. All fibres have a plurality of very tiny flaws as well, which are more numerous. The smaller flaws are not illustrated in FIG. 1. The large flaw 16 has been exaggerated in size for clarity.

As previously stated, to make the fibres break a long way from the crack face, one must make them break at large flaws such as that shown at 16 rather than at the smaller ones, since the large flaws are infrequent and far apart. To accomplish this, the fibre must shrink away from the matrix when the opening crack only exerts a moderate pull on the fibre as shown in sections 1, 2 and 3 in FIG. 1. When the progressive shrinkage of the fibre 10 away from the crack 12 reaches the major flaw 16, as shown at section 4 of FIG. 1, the fibre will break. As soon as the fibre 10 has broken, it loses its tension, separates at the break, and recovers its original diameter. As the crack 12 continues to open, as seen in sections 5 and 6 of FIG. 1, the fibre 10 is frictionally withdrawn from the matrix 14 and this process absorbs energy due to friction between the fibre and the matrix. The longer the pulled-out length, the greater the work expended. Since this work is the main part of the work of fracture, the toughness of the composite can be increased by making this work as large as possible. This is accomplished by maximizing the pulled-out length of the fibre, as aforesaid.

The process has been investigated mathematically (M. R. Piggott Proc. ICF 5 (1981)), and W, the work of fracture, can be calculated approximately utilizing the formula $$W = \frac{\text{constant}}{(1 - CE/S)^2}$$

where C is the amount of shrinkage of the fibre when it is about to break, E is the Young's modulus of the plastic matrix, and S is the stress in the matrix that gives it a grip on the fibres. This formula is developed in a subsequent section. The stress S is the result of the shrinkage of the matrix around the fibres that usually takes place during composite manufacture.

It is clear that if one makes the product of C and E about equal to S, W will be very large. This represents the principle of the present invention.

The fibre shrinkage C is fixed, and is much smaller for carbon and boron fibres than for glass fibres. Thus, S should also be smaller for these fibres, in order to make carbon and boron composites tough. Alternatively, E could be increased to make the composite tough. Glass and Kevlar composites can also be made more tough by reducing S or increasing E.

Figure 2:
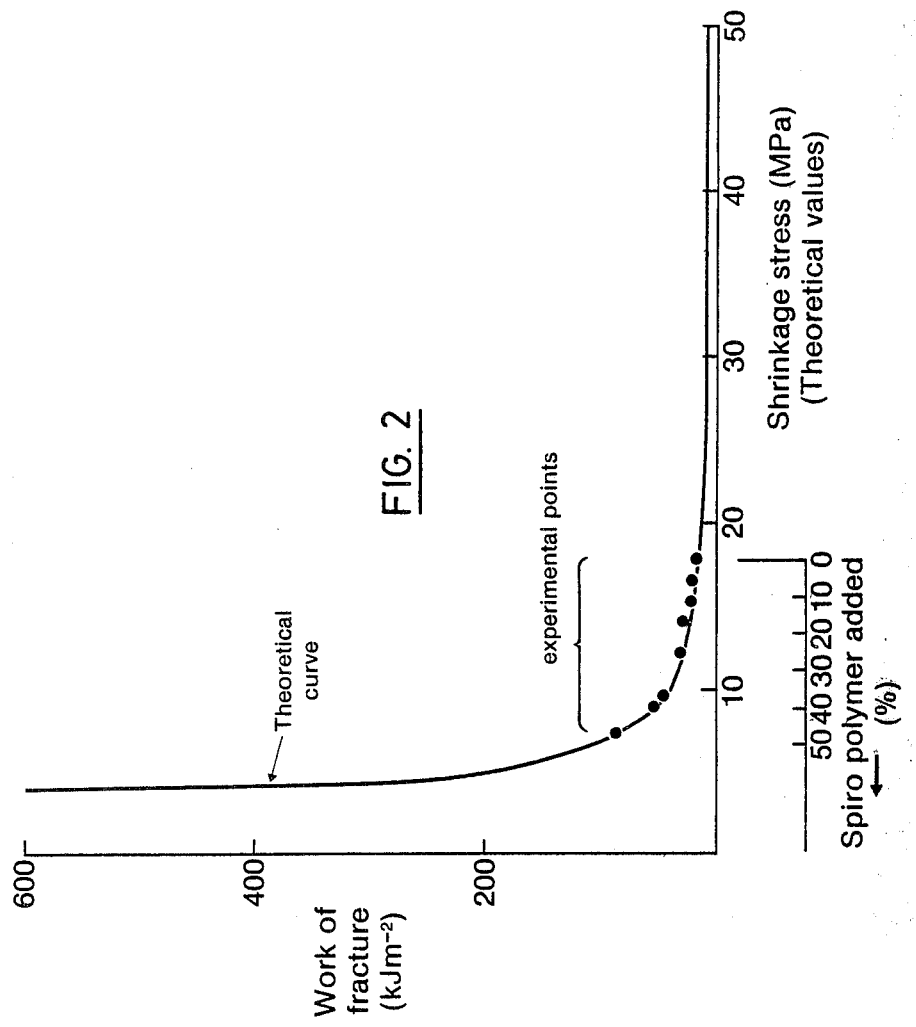

FIG. 2 shows the effect of reducing S for a carbon fibre composite. This can be done, for example, by adding spiro polymer. The curve in FIG. 2 is a plot of the theoretical work of fracture against theoretical values of shrinkage stress. The points marked on the theoretical curve have been generated experimentally, as discussed in the next section, and show that by adding about 50% of spiro polymer, the toughness of a carbon composite can be increased by about 500% as compared with the normal toughness.

Figure 3:
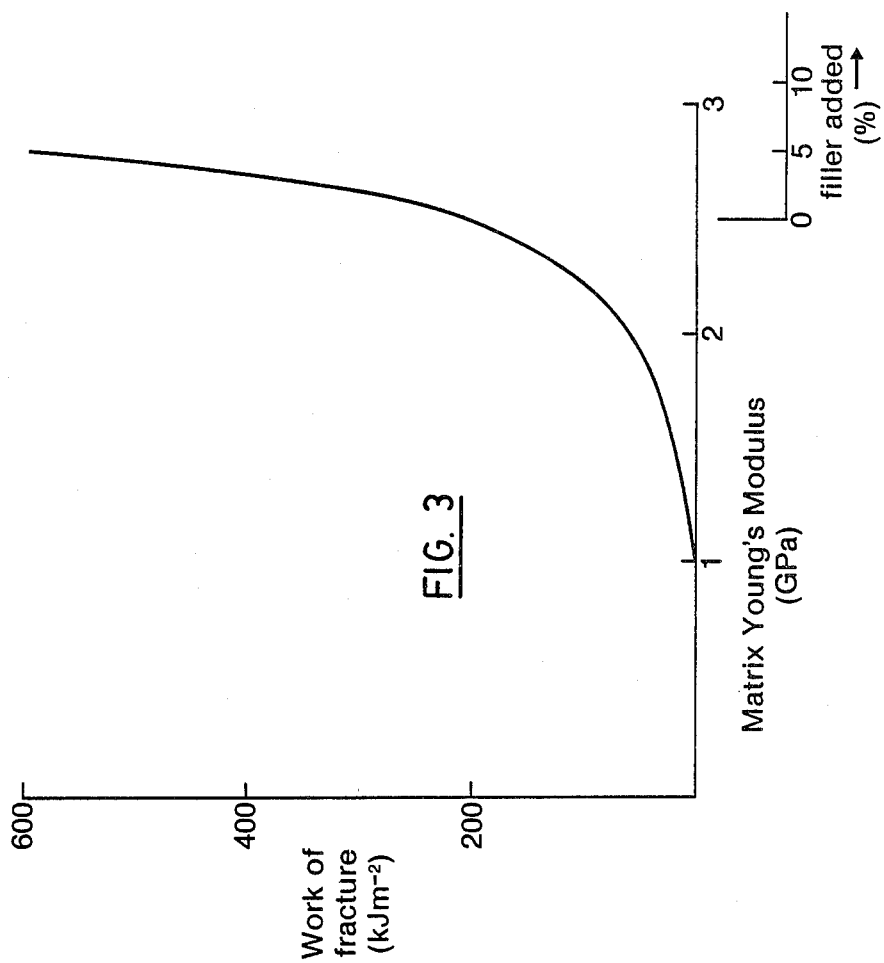

FIG. 3 shows the theoretical effect of increasing E. This can be done by adding a mineral filler or glass beads, although the size of the filler particles must be very small for this method to be effective. It can be seen from FIG. 3 that, theoretically, for a plastic with a Young's modulus of 2.5 GPa, a doubling of the toughness can be obtained with the addition of about 4% by volume of filler.

S should not be reduced below the product of C and E, nor should E be increased above the ratio of S/C, or else the matrix will not grip the fibres well enough, and there is a danger that the strength of the composite will be reduced.

The material referred to above as spiro polymer is known to those familiar with this art. Spiro polymer is polyethercarbonate made by polymerization of a spiro ortho carbonate, for example norbornenyl substituted polyether carbonate made by the polymerization of dinorbornenyl spiro ortho carbonate.

The principal characteristic of a spiro polymer is that, upon solidification or curing, the material expands in volume, rather than shrinks. Thus, by selecting a particular ratio of spiro polymer with a matrix material which does shrink upon curing, the degree of shrink can be very closely controlled.

Further information on spiro polymers may be obtained from a paper by W. J. Bailey et al., entitled "Free Radical Opening Polymerization", published in *Contemporary Topics in Polymer Science*, edited by Michel Shen, published by Plenum Publishing Corporation in 1979, Vol. 3, p. 29.

EXPERIMENTAL RESULTS

Carbon fibre reinforced plastics were made by wetting skeins of fibre with a polymer mixture, and then pulling the fibres and resin inside a glass tube. The composite was next cured by heating to 140° C. and the glass was removed. The resulting rods of reinforced polymer were then notched and tested in an Izod impact machine. The polymer mixture consisted of an epoxy resin, with various amounts of spiro polymer being added. The results are given in Table 1, and shown in FIG. 2.

TABLE 1

Works of fracture of carbon reinforced epoxy-spiro copolymers

| Amount of spiro polymer added (%) | 0 | 3 | 5 | 10 | 15 | 25 | 35 | 40 | 45 |
|---|---|---|---|---|---|---|---|---|---|
| work of fracture (KJm$^{-2}$) | 17 | 19 | 21 | 22 | 28 | 31 | 45 | 52 | 87 |

Theoretical Background

The strength of a fibre such as glass or carbon depends on how long the fibre is, and can be represented by the equation $$T = AL^{-m}$$

where T=fibre tensile strength, L=fibre length, and A and m are constants. m is usually much less than 1.0.

The tension stress in a fibre that bridges a crack decreases with distance from the crack at a rate R, represented by the equation $$R = 4F(S - cE)/D$$

where F is the sliding friction coefficient for the fibre, S is the matrix shrinkage stress, c is the radial contraction of the fibre, which is equal to the multiple of the fibre Poisson's ratio and tensile strain, E is the Young's modulus of the plastic matrix, and D is the fibre diameter.

The work of fracture, W, due to fibres pulling out from a crack in a composite is given by the equation $$W = 4Vl^2 FS/D$$

where V is the relative fibre volume, and l is the length of each fibre pulled out.

l is the value of L needed to make the decrease of T (as L increases) equal to R. We can calculate this easily, only if we let m=0, except when its small value is significant. The rate of decrease of T is $mAL^{-m-1}$, which thus becomes mA/L, approximately. So R is approximately equal to mA/L, and $$mA/L \simeq F(S - CE)/D$$

In this equation we have made c=C because the fibres are at the breaking point. The break will occur, on average, at a distance l (=L) from the crack face. This equation gives us the value of l to use in the equation for W. The equation for W then becomes $$W \simeq \frac{VDm^2 A^2 S}{4F(S - CE)^2}$$

This equation can be written $$W \simeq \frac{\text{constant}}{(1 - CE/S)^2}$$

since $VDm^2 A^2/4F$ is a constant which is independent of the matrix Young's modulus and shrinkage stress.

I claim:

1. In a fibre-reinforced composite material consisting of a matrix having a Young's modulus of E and a plurality of fibres embedded in the matrix, the average fibre Poisson's shrinkage at breaking stress being C, the matrix being of a material which shrinks while changing from a liquid or plasticized state to a solid state, the linear shrinkage stress of the matrix being S,
    the improvement which comprises selecting a fibre material or a matrix material or both, such that S is substantially equal to, but not smaller than, the product of C and E.

2. In a fibre-reinforced composite material consisting of a matrix and a plurality of fibres embedded in the matrix, the matrix being of a material which shrinks while changing from a liquid or plasticized state to a solid state, the improvement which comprises selecting a batch of fibres, and then making a matrix material using a mixture of ingredients, so that, upon development in the matrix of a crack bridged by a fibre, the grip of the matrix on the fibre due to matrix shrinkage will be small enough to allow the fibre, while stretching, to progressively shrink away from the matrix beginning at the crack, but large enough to cause the fibre to break when the progressive fibre shrinkage reaches a major flaw in the fibre.

3. In a fibre-reinforced composite material consisting of a matrix and a plurality of fibres embedded in the matrix, the matrix being of a material which shrinks while changing from a liquid or plasticized state to a solid state, the improvement which comprises using a fibre of which the fibre Poisson's shrinkage at breaking stress is substantially the same as the matrix contraction strain, wherein the fibre Poisson's shrinkage is defined as the fibre breaking strain measured on a moderate fibre length, multiplied by the fibre Poisson's ratio.

4. The invention claimed in claim 3, in which the match of fibre Poisson's shrinkage to matrix contraction strain is accomplished by the use of fillers in the matrix, which inhibit matrix contraction and/or increase the matrix modulus.

5. The invention claimed in claim 4, in which the matrix filler is ground to a size having an average diameter less than the fibre diameter.

6. The invention claimed in claim 5, in which said average diameter is less than the fibre diameter by a factor of at least 10.

7. A method of increasing the toughness of a fibre-reinforced composite material consisting of a matrix and a plurality of fibres embedded in the matrix, the matrix being of a material which shrinks while changing from a liquid or plasticized state to a solid state, consisting of using a fibre of which the fibre Poisson's shrinkage at breaking stress is substantially the same as the matrix contraction strain, wherein the fibre Poisson's shrinkage is defined as the fibre breaking strain measured on a moderate length, multiplied by the fibre Poisson's ratio.

8. The method claimed in claim 7, in which the matching of the fibre Poisson's shrinkage at breaking stress to the matrix contraction strain is accomplished by adding a filler to a matrix material for which, without the filler, the matching does not occur.

9. A fibre-reinforced composite material comprising:
    a matrix material which shrinks while changing from a liquid or plasticized state to a solid state, the matrix having a Young's modulus of E and a linear shrinkage of S,
    and a plurality of fibres embedded in the matrix, the fibres having an average Poisson's shrinkage at breaking stress of C, the fibre Poisson's shrinkage being defined as the fibre breaking strain measured on a moderate fibre length, multiplied by the fibre Poisson's ratio,
    S being substantially equal to, but not smaller than, the product of C and E.

10. A method of enhancing the toughness of a fibre-reinforced composite material consisting of a matrix and a plurality of fibres embedded in the matrix, the matrix being of a material which shrinks while changing from a liquid or plasticized state to a solid state, which method involves adding to the matrix prior to solidification, a sufficient quantity of a particulate filler material to cause the matrix contraction strain to match closely the fibre Poisson's shrinkage at breaking stress, the fibre Poisson's shrinkage being defined as the fibre breaking strain measured on a moderate length, multiplied by the fibre Poisson's ratio.

11. The invention of claim 7 wherein the fibres are selected from the group comprising: (1) carbon fibres, (2) Kevlar fibres, (3) glass fibres.

12. The invention of claim 7 wherein the fibres are longer than a quarter of a millimeter.

* * * * *